(12) United States Patent
Ogose et al.

(10) Patent No.: US 11,045,967 B2
(45) Date of Patent: Jun. 29, 2021

(54) CUTTING METHOD AND CUTTING DEVICE FOR STRIP MEMBER

(71) Applicant: Toyo Tire Corporation, Itami (JP)

(72) Inventors: Ryuji Ogose, Itami (JP); Hiroaki Morino, Itami (JP); Yu Hatayama, Itami (JP)

(73) Assignee: TOYO TIRE CORPORATION, Itami (JP)

( * ) Notice: Subject to any disclaimer, the term of this patent is extended or adjusted under 35 U.S.C. 154(b) by 318 days.

(21) Appl. No.: 16/331,628

(22) PCT Filed: Oct. 3, 2017

(86) PCT No.: PCT/JP2017/035948
§ 371 (c)(1),
(2) Date: Mar. 8, 2019

(87) PCT Pub. No.: WO2018/070299
PCT Pub. Date: Apr. 19, 2018

(65) Prior Publication Data
US 2019/0358842 A1    Nov. 28, 2019

(30) Foreign Application Priority Data

Oct. 13, 2016  (JP) .............................. JP2016-201589

(51) Int. Cl.
*B26D 3/00* (2006.01)
*B29D 30/46* (2006.01)
(Continued)

(52) U.S. Cl.
CPC .............. *B26D 3/003* (2013.01); *B26D 5/20* (2013.01); *B26D 5/42* (2013.01); *B26D 7/015* (2013.01);
(Continued)

(58) Field of Classification Search
CPC . B26D 3/003; B26D 5/20; B26D 5/42; B26D 7/015; B29D 30/46; B29D 2030/463
(Continued)

(56) References Cited

U.S. PATENT DOCUMENTS 4,781,087 A * 11/1988 Shibata .................. B26D 1/085
83/18
2009/0032181 A1  2/2009 Tatara et al.
(Continued)

FOREIGN PATENT DOCUMENTS

JP       2001-9929 A    1/2001
JP       2005-193328 A  7/2005
(Continued)

OTHER PUBLICATIONS

International Search Report dated Nov. 14, 2017, issued in counterpart application No. PCT/JP2017/035948 (2 pages).

*Primary Examiner* — Kenneth E Peterson
*Assistant Examiner* — Liang Dong
(74) *Attorney, Agent, or Firm* — Westerman, Hattori, Daniels & Adrian, LLP (57) ABSTRACT

A front end feeding device 23 between a cutter 10 and a fixed-length feeding hand 30 that feeds a strip member 5 on an upstream side of the cutter 10 feeds a front end of the strip member 5 a short distance to a downstream side of the cutter 10, a front end grasping hand 60 on the downstream of the cutter 10 holds the front end of the strip member 5 fed the short distance, the fixed-length feeding hand 30 holds a part of the strip member 5 fed the short distance on the upstream side of the cutter 10, the front end grasping hand 60 and the fixed-length feeding hand 30 synchronously feed the strip member 5 a long distance to the downstream side, and the cutter 10 cuts the strip member 5 having been fed the long distance.

7 Claims, 10 Drawing Sheets

(51) Int. Cl.
*B26D 5/20* (2006.01)
*B26D 5/42* (2006.01)
*B26D 7/01* (2006.01)

(52) U.S. Cl.
CPC ........ B29D 30/46 (2013.01); *B29D 2030/463* (2013.01)

(58) Field of Classification Search
USPC .................................................. 83/206, 277
See application file for complete search history.

(56) References Cited

U.S. PATENT DOCUMENTS

2010/0071844 A1   3/2010   Tatara et al.
2011/0284168 A1   11/2011  Tatara et al.

FOREIGN PATENT DOCUMENTS

| JP | 2015-98083 A | 5/2015 |
| WO | 2006/103861 A1 | 10/2006 |
| WO | 2007/010592 A1 | 1/2007 |

\* cited by examiner

CUTTING METHOD AND CUTTING DEVICE FOR STRIP MEMBER

TECHNICAL FIELD

The present invention relates to a cutting method and a cutting device for a strip member.

BACKGROUND ART

As described in PTL 1, in manufacturing of a belt of a tire, there is a process in which, when one long strip member is fed from the upstream side to the downstream side of a cutter and the front end part of the strip member reaches a predetermined distance on the downstream side of the cutter, the strip member is cut by the cutter. A plurality of small strip pieces created by cutting in this process is connected in another place to form one belt.

A specific method for feeding a strip member from the upstream side to the downstream side of the cutter in the above process is described in PTL 2. This specific method uses a holding member capable of holding the strip member and moving on the upstream side of the cutter. This holding member carries the strip member by holding the part on the upstream side of the strip member and pushing the front end of the strip member toward the downstream side of the cutter.

PRIOR ART DOCUMENTS

PTL 1: WO 2007/010592
PTL 2: WO 2006/103861

SUMMARY OF THE INVENTION

Problems to be Solved by the Invention

Since the method in PTL 2 feeds the strip member in a free state in which the front end of the strip member is not held by the holding member, however, the front end of the strip member may catch in the position of the cutter or the like and the front end may not be fed successfully to the downstream side of the cutter.

Accordingly, an object of the invention is to provide a cutting method and a cutting device in which a strip member does not easily catch while the strip member is fed to the downstream side of the cutter.

Means for Solving the Problems

According to an embodiment of the invention, there is provided a cutting method for a strip member that cuts a strip member for a belt of a tire one after another while feeding the strip member from an upstream side to a downstream side of a cutter, the cutting method including causing a front end feeding device provided between the cutter and a fixed-length feeding hand that feeds the strip member on the upstream side of the cutter to hold the strip member, feed a front end thereof a short distance to the downstream side of the cutter, release the strip member, and return to a waiting position in which the front end feeding device has been located before holding the strip member; causing a front end grasping hand provided on the downstream side of the cutter to hold the front end of the strip member fed the short distance and the fixed-length feeding hand to hold a part of the strip member fed the short distance, the part being present on the upstream side of the cutter; causing the front end grasping hand and the fixed-length feeding hand to synchronously feed the strip member a long distance to the downstream side, release the strip member, and return to waiting positions in which the front end grasping hand and the fixed-length feeding hand have been located before holding the strip member; and causing the front end feeding device to hold the strip member fed the long distance in the waiting position thereof, the cutter to perform cutting of the strip member, and the front end feeding device to feed the strip member the short distance after the cutting.

In addition, according to the embodiment of the invention, there is provided a cutting device for a strip member that cuts a strip member for a belt of a tire one after another while feeding the strip member from an upstream side to a downstream side of a cutter, the cutting device including a cutter that performs cutting of the strip member each time the strip member is fed a long distance from the upstream side to the downstream side; a front end feeding device that holds, in a waiting position on the upstream side of the cutter, the strip member fed the long distance, feeds a front end of the strip member a short distance to the downstream side of the cutter after the cutting, and releases the strip member after feeding the front end the short distance, and returns to the waiting position; a front end grasping hand that holds the front end of the strip member fed the short distance, draws the front end the long distance to the downstream side, releases the strip member, and returns to the waiting position in which the front end grasping hand has been located before holding the strip member, the grasping hand being provided on the downstream side of the cutter; and a fixed-length feeding hand that holds a part of the strip member fed the short distance, the part being present on the upstream side of the cutter, feeds the strip member the long distance to the downstream side synchronously with the front end grasping hand, releases the strip member, and returns to the waiting position in which the fixed-length feeding hand has been located before holding the strip member, the fixed-length feeding hand being provided on the upstream side of the front end feeding device.

Advantage of the Invention

The cutting method and the cutting device for a strip member according to the embodiment feed a strip member a long distance while holding the front end and the part on the upstream side thereof, the strip member does not easily catch while being fed.

MODE FOR CARRYING OUT THE INVENTION

An embodiment will be described with reference to the drawings. The direction in which a strip member 5 is fed is referred to as the downstream side and the direction opposite thereto is referred to as the upstream side.

First, the entire structure of a belt manufacturing device 1, the structure of the strip member 5, and the entire structure of a cutting device 2 will be described.

Figure 1:
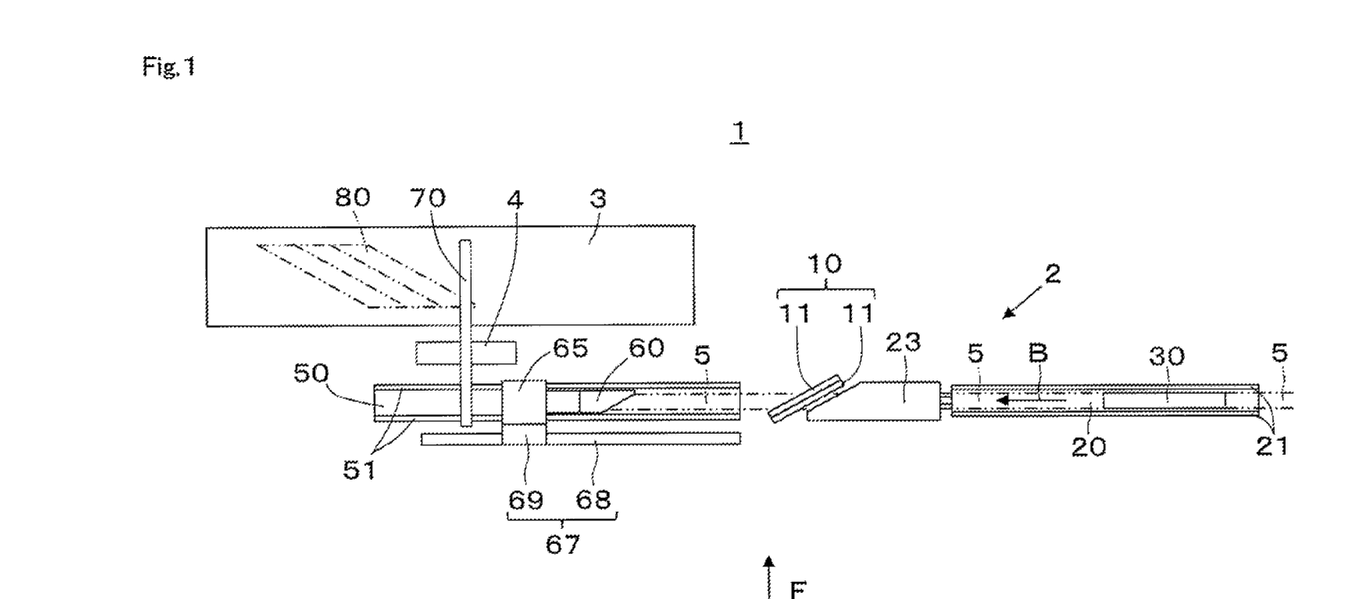
FIG. 1 is a plan view of a belt manufacturing device 1 seen from above.

The belt manufacturing device 1 illustrated in FIG. 1 includes the cutting device 2 that cuts the strip member 5 for the belt of a tire while feeding the strip member 5 from the upstream side to the downstream side, an arrangement conveyer 3 on which strip pieces 80 obtained by cutting the strip member 5 are arranged, and a carrying device 4 that carries the strip pieces 80 from the cutting device 2 to the arrangement conveyer 3. It should be noted here that an arrow B in FIG. 1 and FIG. 2 represents the direction in which the strip member 5 is fed.

Figure 3A:
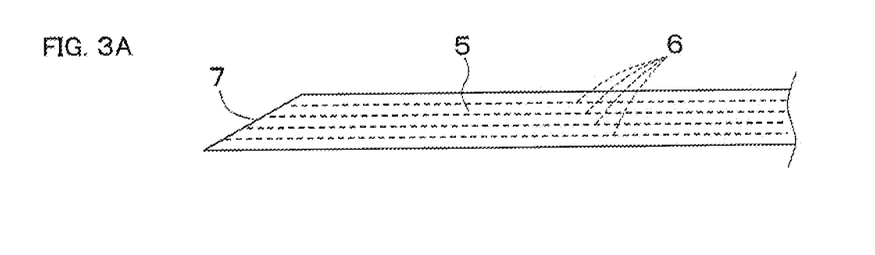
FIG. 3A is a plan view of a strip member 5.
Figure 3B:
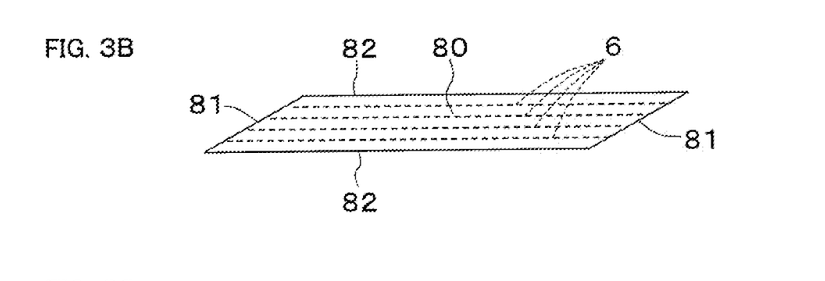
FIG. 3B is a plan view of a strip piece 80.
Figure 3C:
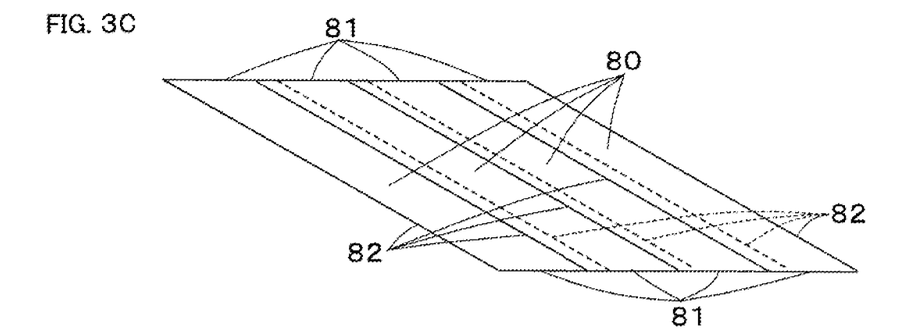
FIG. 3C is a plan view of a plurality of the strip pieces 80 arranged (cords 6 are omitted).

The strip member 5 to be cut in the embodiment is a plurality of metal cords 6 that is arranged in parallel and covered with rubber, as illustrated in FIG. 3A. The direction in which the strip member 5 extends is the same as the direction in which the cords 6 extend. The strip member 5 is cut by the cutting device 2 into a plurality of the strip pieces 80 having a predetermined length. The strip member 5 is cut obliquely with respect to the extension direction thereof. Accordingly, as illustrated in FIG. 3B, the strip piece 80 is a slender parallelogram having two cut edges 81 as one set of opposite sides and two uncut edges 82 as the other set of opposite sides. The plurality of strip pieces 80 is arranged on the arrangement conveyer 3 so that parts of the strip pieces 80 close to the uncut edges 82 overlap each other as illustrated in FIG. 3C. The overlapped pails are bonded to form one belt.

Figure 2:
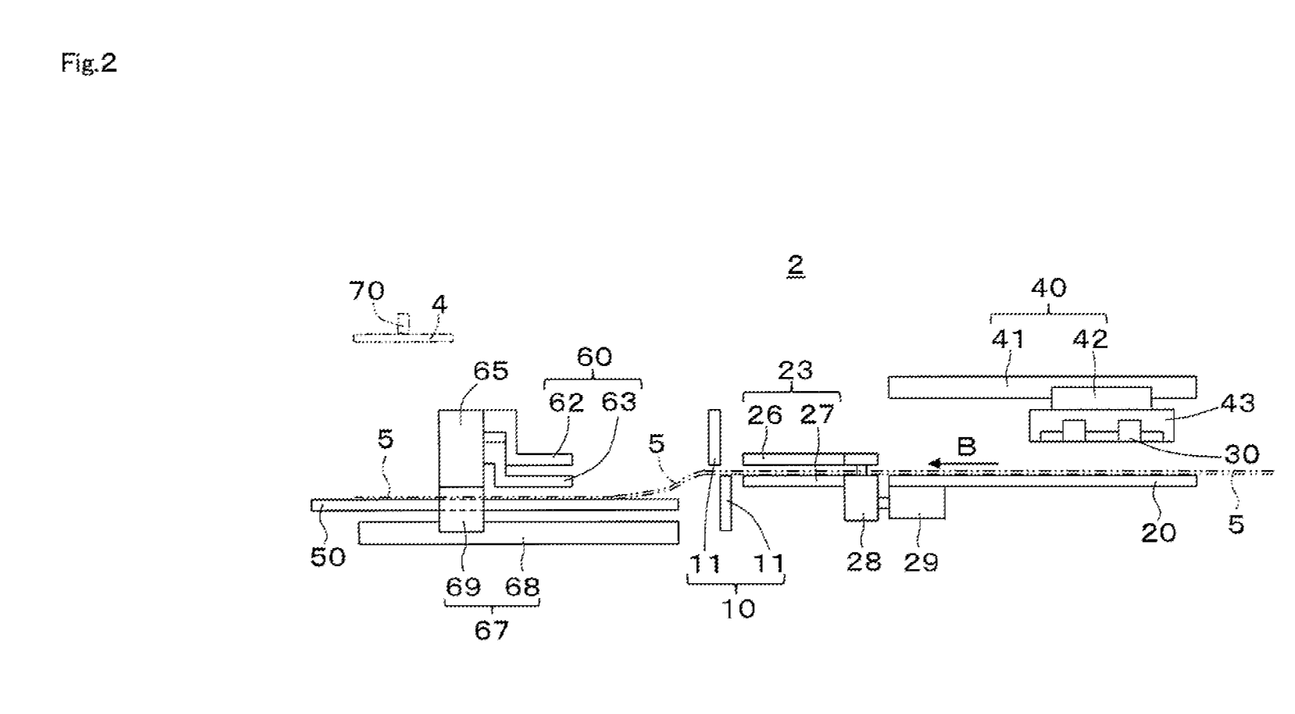
FIG. 2 is a front view of a cutting device 2 seen from a direction of an arrow F in FIG. 1.

The cutting device 2 illustrated in FIG. 1 and FIG. 2 includes a cutter 10 that cuts the strip member 5, a feeding table 20 that is a passage for the strip member 5 on the upstream side of the cutter 10, a front end feeding device 23 disposed between the cutter 10 and the feeding table 20, and a carrying out table 50 on which the strip pieces 80 are placed on the downstream side of the cutter 10. As described in detail later, the front end feeding device 23 feeds the strip member 5a short distance to the downstream side.

Furthermore, the cutting device 2 has a fixed-length feeding hand 30 and a front end grasping hand 60 capable of holding the strip member 5. The fixed-length feeding hand 30 is capable of moving along the feeding table 20 above the feeding table 20. The front end grasping hand 60 is capable of moving along the carrying out table 50 above the carrying out table 50. As described in detail later, the fixed-length feeding hand 30 and the front end grasping hand 60 feed the strip member 5 a long distance to the downstream side. Here, a long distance represents a distance that is longer than the short distance.

Next, the specific structures of individual parts included in the belt manufacturing device 1 will be described with reference to FIG. 1 and FIG. 2.

As illustrated in FIG. 1, side walls 21 are provided on both sides in the width direction of the feeding table 20. The interval between the side walls 21 on both sides is the same as or slightly larger than the width of the strip member 5. These side walls 21 prevent the strip member 5 from deviating in the width direction thereof on the feeding table 20. The strip member 5 is supplied from a supply device (not illustrated) to the feeding table 20.

As illustrated in FIG. 2, a fixed-length feeding device 40 is provided above the feeding table 20. The fixed-length feeding device 40 has moving means 41 and a moving body 42 that is moved along the feeding table 20 by the operation of the moving means 41. The moving means 41 is, for example, a ball screw mechanism driven by a servo motor. Raising and lowering means 43 and the fixed-length feeding hand 30 that can be raised and lowered by the operation of the raising and lowering means 43 are attached to the moving body 42 . The raising and lowering means 43 is, for example, an air cylinder. The fixed-length feeding hand 30 can absorb and hold the strip member 5 on the feeding table 20 using absorption means such as magnetic absorption or vacuum absorption or can release the strip member 5 by releasing absorption. When the moving means 41 operates, the moving body 42, the raising and lowering means 43, and the fixed-length feeding hand 30 integrally move along the feeding table 20. The fixed-length feeding hand 30 moves between a waiting position of the fixed-length feeding hand 30 and a predetermined position on the downstream side of the waiting position of the fixed-length feeding hand 30. The waiting position of the fixed-length feeding hand 30 is located in a predetermined position on the upstream side of the feeding table 20.

When the fixed-length feeding hand 30 feeds the strip member 5 on the table 20 to the downstream side, the moving means 41 first operates and the fixed-length feeding hand 30 thereby moves to the waiting position located on the upstream side of the feeding table 20. Next, the raising and lowering means 43 operates and the fixed-length feeding hand 30 thereby lowers to the position of the strip member 5. Next, the fixed-length feeding hand 30 absorbs and holds the strip member 5. Next, the moving means 41 operates and moves the fixed-length feeding hand 30 to the downstream side. When the fixed-length feeding hand 30 moves to the downstream side, the strip member 5 held by the fixed-length feeding hand 30 is thereby fed to the downstream side. After the fixed-length feeding hand 30 moves a predetermined distance and stops, the fixed-length feeding hand 30 releases the strip member 5, rises, and returns to the original waiting position. This operation intermittently feeds the strip member 5 to the downstream side.

As illustrated in FIG. 2, the front end feeding device 23 includes an upper plate 26 and a lower plate 27. When the front end feeding device 23 is in an open state, the upper plate 26 and the lower plate 27 are separated from each other. In contrast, when the front end feeding device 23 is in a closed state, the upper plate 26 and the lower plate 27 come close to each other, clamp the strip member 5, and hold the strip member 5 from above and below.

The front end feeding device 23 is provided with an open/close device 28 that opens and closes the front end feeding device 23 and a moving device 29 that moves the front end feeding device 23 and the open/close device 28 between the upstream side and the downstream side.

The open/close device 28 is, for example, an air cylinder in which a piston moves up and down. The upper plate 26 is provided on the piston side and the lower plate 27 is provided on the cylinder side. The front end feeding device 23 including the upper plate 26 and the lower plate 27 is opened and closed by moving the upper plate 26 up and down with respect to the lower plate 27.

The moving device 29 moves the front end feeding device 23 between a waiting position of the front end feeding device 23 and a passing position on the downstream side of the waiting position of the front end feeding device 23. The waiting position of the front end feeding device 23 is located in the vicinity of an end part of the feeding table 20 on the downstream side. The passing position is located in the vicinity of the cutter 10. The moving device 29 is, for example, an air cylinder provided near the end part of the feeding table 20 on the downstream side and moves the piston toward the downstream side. This piston is provided with the open/close device 28 and the front end feeding device 23. In this structure, when the air cylinder, which is the moving device 29, operates, the front end feeding device 23 moves between the waiting position of the front end feeding device 23 and the passing position. It should be noted here that the movable range of the front end feeding device 23 may be limited to the upstream side of the cutter 10 or may extend to the downstream side of the cutter 10.

The operation when the front end feeding device 23 feeds the strip member 5 to the downstream side will be described. It is assumed that the front end feeding device 23 is open in the waiting position of the front end feeding device 23 and the strip member 5 is placed on the lower plate 27. Next, when the open/close device 28 operates, the front end feeding device 23 is closed and the front end feeding device 23 holds the strip member 5. Next, the operation of the moving device 29 moves the front end feeding device 23 holding the strip member 5 to the downstream side. When the front end feeding device 23 moves to the downstream side, the strip member 5 held by the front end feeding device 23 is fed to the downstream side. The front end feeding device 23 moves to a reception position and stops. After the stop, the front end feeding device 23 is opened and the strip member 5 is released. After that, the front end feeding device 23 returns to the waiting position of the front end feeding device 23 while being kept open. This operation intermittently feeds the strip member 5 to the downstream side.

The cutter 10 cuts the strip member 5 obliquely with respect to the extension direction of the strip member 5. Although the structure of the cutter 10 is not limited, for example, the structure includes a set of upper and lower blades 11 as illustrated in FIG. 2. The cutter 10 maybe able to adjust the cutting angle with respect to the extension direction of the strip member 5. Each time the strip member 5 is intermittently fed to the downstream side by the fixed-length feeding hand 30 and the front end grasping hand 60, the cutter 10 cuts the strip member 5.

As illustrated in FIG. 1, side walls 51 are provided on both sides in the width direction of the carrying out table 50. The interval between the side walls 51 on both sides is the same as or slightly larger than the width of the strip piece 80. The interval between the side walls 51 on both sides may be adjustable. These side walls 51 prevent the strip piece 80 from deviating in the width direction thereof on the carrying out table 50. As illustrated in FIG. 2, the feeding table 20 and the front end feeding device 23 are disposed at substantially the same height and the front end grasping hand 60 and the cutter 10 operate at the same height as them, but the carrying out table 50 is disposed at the height lower than them. The carrying out table 50 is movable between a reception position in which the strip piece 80 is received and a carry out position in which the strip piece 80 is carried out on the downstream side of the cutter 10. The carry out position is located on the downstream side of the reception position.

As illustrated in FIG. 2, the front end grasping hand 60 has an upper plate 62 and a lower plate 63. When the front end grasping hand 60 is in an open state, the upper plate 62 is separated from the lower plate 63. In contrast, when the front end grasping hand 60 is in a closed state, the upper plate 62 and the lower plate 63 come close to each other, clamp the strip member 5 from above and below, and hold the strip member 5.

The front end grasping hand 60 is provided with an open/close device 65 that opens and closes the front end grasping hand 60 and a moving device 67 that moves the front end grasping hand 60 and the open/close device 65 between the upstream side and the downstream side.

The open/close device 65 is, for example, an air cylinder in which a piston moves up and down. The upper plate 62 is provided on the piston side and the lower plate 63 is provided on the cylinder side. In this structure, when the upper plate 62 moves up and down with respect to the lower plate 63, the front end grasping hand 60 including the upper plate 62 and the lower plate 63 is opened and closed.

The moving device 67 moves the front end grasping hand 60 between the passing position described above by the front end feeding device 23 and a predetermined position on the downstream side thereof. A waiting position of the front end grasping hand 60 is located on the slightly downstream side of the passing position between these two positions. The moving device 67 has moving means 68 and a moving body 69 moved along the carrying out table 50 by the moving means 68. The moving means 68 is, for example, a ball screw mechanism driven by a servo motor. The moving body 69 is provided with the open/close device 65 and the front end grasping hand 60 and, when the moving means 68 operates, the moving body 69, the open/close device 65, and the front end grasping hand 60 move integrally.

When the front end grasping hand 60 draws the strip member 5 to the downstream side, the moving means 68 first operates and the front end grasping hand 60 thereby moves to the waiting position. Next, just when or after the front end feeding device 23 feeds the strip member 5 to the downstream side, the moving means 68 operates and the front end grasping hand 60 thereby moves to the passing position of the strip member 5. Next, the open/close device 65 operates and the front end grasping hand 60 thereby holds a front end 7 of the strip member 5 having reached the passing position. Next, the moving means 68 operates and the front end grasping hand 60 holding the front end 7 of the strip member 5 thereby moves to the downstream side. When the front end grasping hand 60 moves to the downstream side, the strip member 5 held by the front end grasping hand 60 is drawn to the downstream side. This operation intermittently draws the strip member 5 to the downstream side.

The carrying device 4 illustrated in FIG. 1 has absorption means such as magnetic absorption or vacuum absorption and has the structure that can absorb and release the strip piece 80. In addition, the carrying device 4 can move up and down. A horizontally moving device 70 is provided across the cutting device 2 and the arrangement conveyer 3 and, when the horizontally moving device 70 operates, the carrying device 4 can move horizontally between the cutting device 2 and the arrangement conveyer 3.

When the carrying device 4 carries the strip piece 80 from the cutting device 2 to the arrangement conveyer 3, the carrying out table 50 on which the strip piece 80 is placed moves to the carry out position. Next, the carrying device 4 moves above the carry out position, then lowers, and absorbs the strip piece 80 on the carrying out table 50. Next the carrying device 4 rises and lifts the strip piece 80 up. Next, the horizontally moving device 70 moves the carrying device 4 above the arrangement conveyer 3. Next, the carrying device 4 lowers. Next, the carrying device 4 releases the strip piece 80 and places the strip piece 80 in a predetermined position on the arrangement conveyer 3.

Each time the carrying device 4 carries one strip piece 80 and places the strip piece 80 on the arrangement conveyer 3, the arrangement conveyer 3 rotates a predetermined distance in one direction and moves the strip piece 80 the predetermined distance. This predetermined distance is determined so that the part (near the uncut edge 82) of the strip piece 80 placed first on the arrangement conveyer 3 overlaps the part (near the uncut edge 82) of the strip piece 80 placed next on the arrangement conveyer 3. The arrangement conveyer 3 is provided with a pressing device that presses the overlapped parts of the strip pieces 80. Each time the strip piece 80 is placed on the arrangement conveyer 3, the pressing device presses the overlapped parts of this strip piece 80 and the strip piece 80 placed on the arrangement conveyer 3 immediately before. The plurality of the strip pieces 80 are bonded by depression to form one belt.

Next, the cutting method for the strip member 5 by the cutting device 2 and the manufacturing method for a belt by the belt manufacturing device 1 will be described with reference to FIG. 4 to FIG. 10. The cutting device 2 cuts the strip member 5 one after another while feeding the strip member 5 from the upstream side to the downstream side of the cutter 10 by repeating the operations illustrated in FIG. 4 to FIG. 10.

Figure 4:
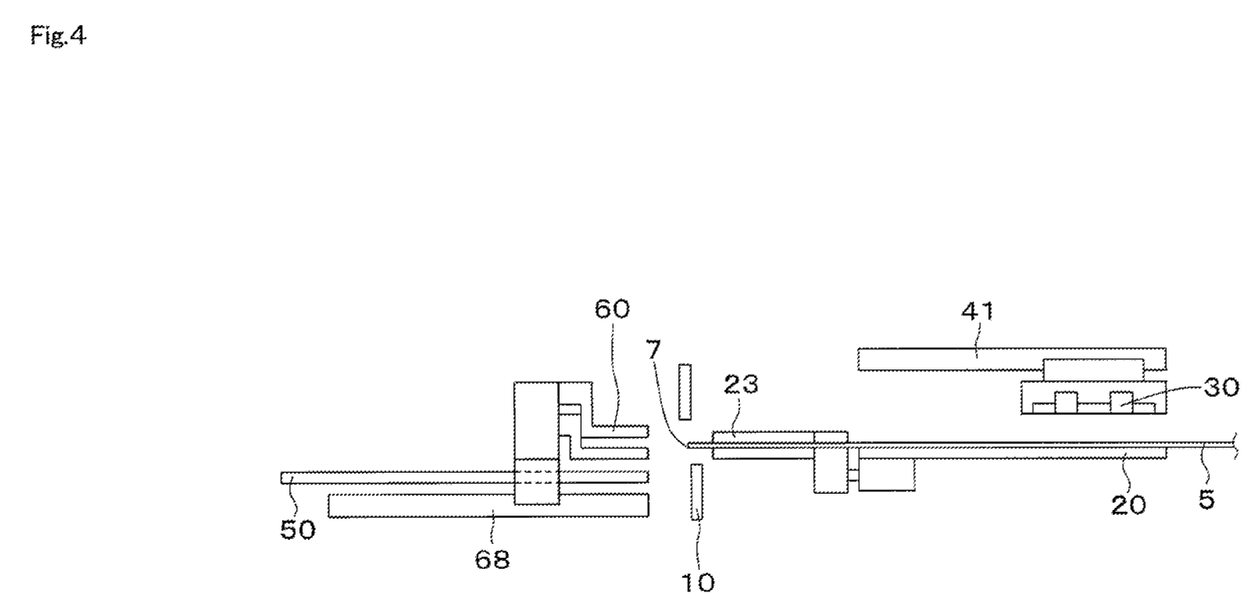
FIG. 4 is a perspective view of the cutting device 2 immediately before a front end feeding device 23 feeds the ship member 5 a short distance.

It is assumed that, as illustrated in FIG. 4, the strip member 5 for which the front end 7 has been cut in advance is placed on the feeding table 20 and the front end 7 is present in the position of the cutter 10. That is, the strip member 5 is present in the position immediately after the front end has been cut by the cutter 10. At this time, the front end feeding device 23 holds the strip member 5 in the waiting position thereof. In addition, the front end 7 of the strip member 5 projects to the downstream side of the front end feeding device 23. In addition, the fixed-length feeding hand 30 and the front end grasping hand 60 are located in the waiting positions thereof and have released the strip member 5. In addition, the carrying out table 50 is disposed in the carry out position.

Figure 5:
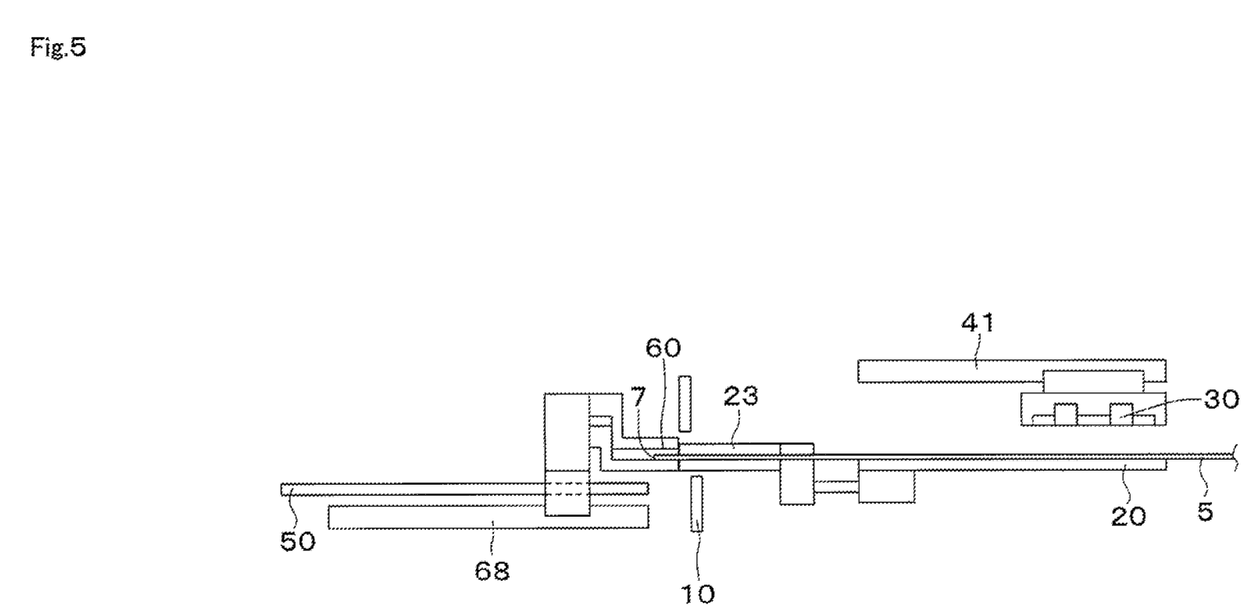
FIG. 5 is a perspective view of the cutting device 2 immediately after the front end feeding device 23 feeds the strip member 5 the short distance.

Next, the front end feeding device 23 moves toward the passing position and feeds the strip member 5 a short distance to the downstream side. As illustrated in FIG. 5, when the front end feeding device 23 reaches the passing position, the front end 7 of the strip member 5 reaches a position on the downstream side of the cutter 10. In addition, the front end grasping hand 60 moves toward the upstream side from the waiting position and, just when or after the front end feeding device 23 reaches the passing position, the front end grasping hand 60 also reaches the passing position.

Figure 6:
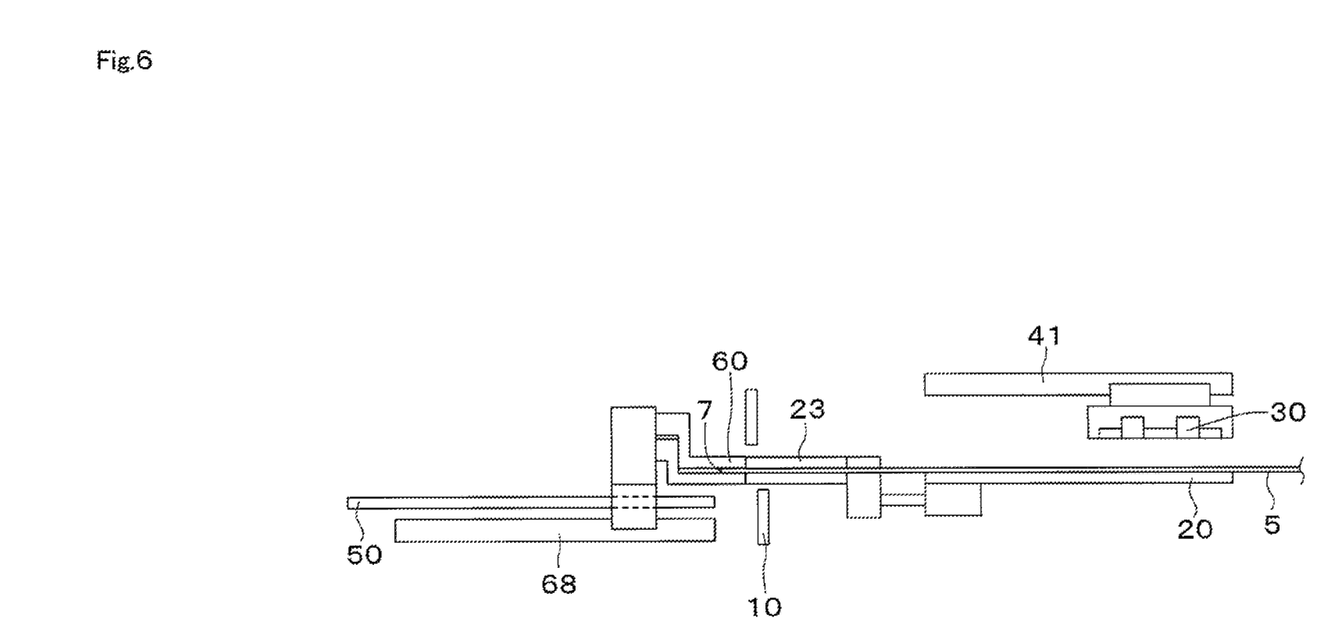
FIG. 6 is a perspective view of the cutting device 2 when a front end grasping hand 60 has held a front end 7 of the strip member 5.

Next, as illustrated in FIG. 6, the front end grasping hand 60 holds the front end 7 of the strip member 5. In this way, the strip member 5 is passed from the front end feeding device 23 to the front end grasping hand 60.

Figure 7:
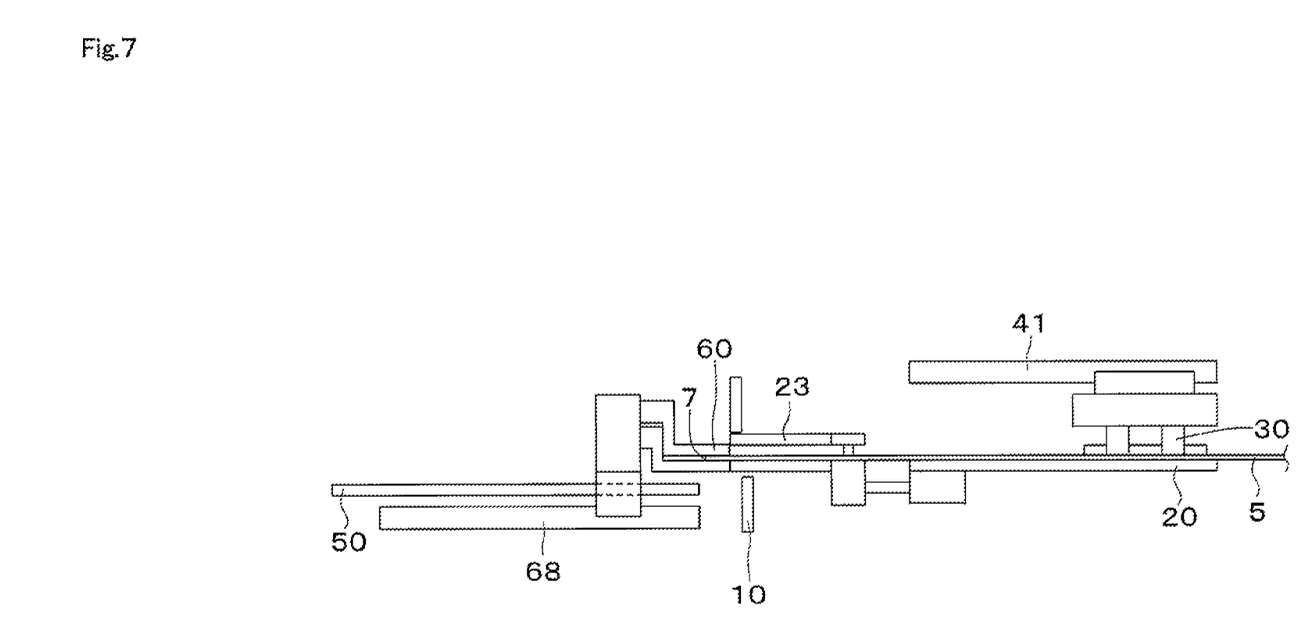
FIG. 7 is a perspective view of the cutting device 2 when a front end feeding device 23 has released the strip member 5.

Next, as illustrated in FIG. 7, the front end feeding device 23 releases the strip member 5. After that, the front end feeding device 23 returns to the waiting position. In addition, after the strip member 5 is fed a short distance by the front end feeding device 23, the fixed-length feeding hand 30 holds the strip member 5 in the waiting position thereof on the upstream side of the cutter 10.

Figure 8:
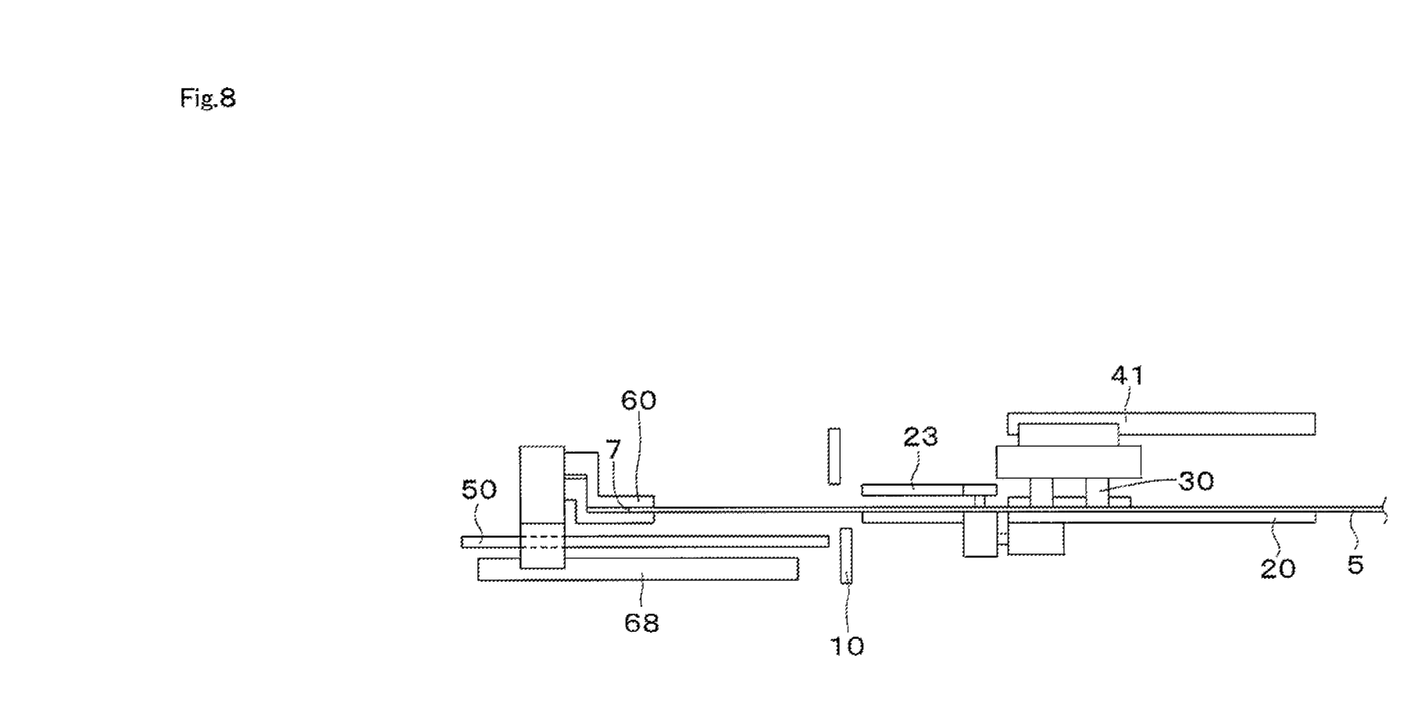
FIG. 8 is a perspective view of the cutting device 2 immediately after the front end grasping hand 60 and a fixed-length feeding hand 30 have fed the strip member 5 a long distance.

Next, as illustrated in FIG. 8, the front end grasping hand 60 and the fixed-length feeding hand 30 synchronously move a long distance to the downstream side and feed the strip member 5 a long distance to the downstream side. Here, the synchronous movement of the front end grasping hand 60 and the fixed-length feeding hand 30 represents that the front end grasping hand 60 and the fixed-length feeding hand 30 simultaneously move at the same speed. Substantially as soon as the front end grasping hand 60 and the fixed-length feeding hand 30 move a long distance, the carrying out table 50 moves to the reception position near the cutter 10.

Figure 9:
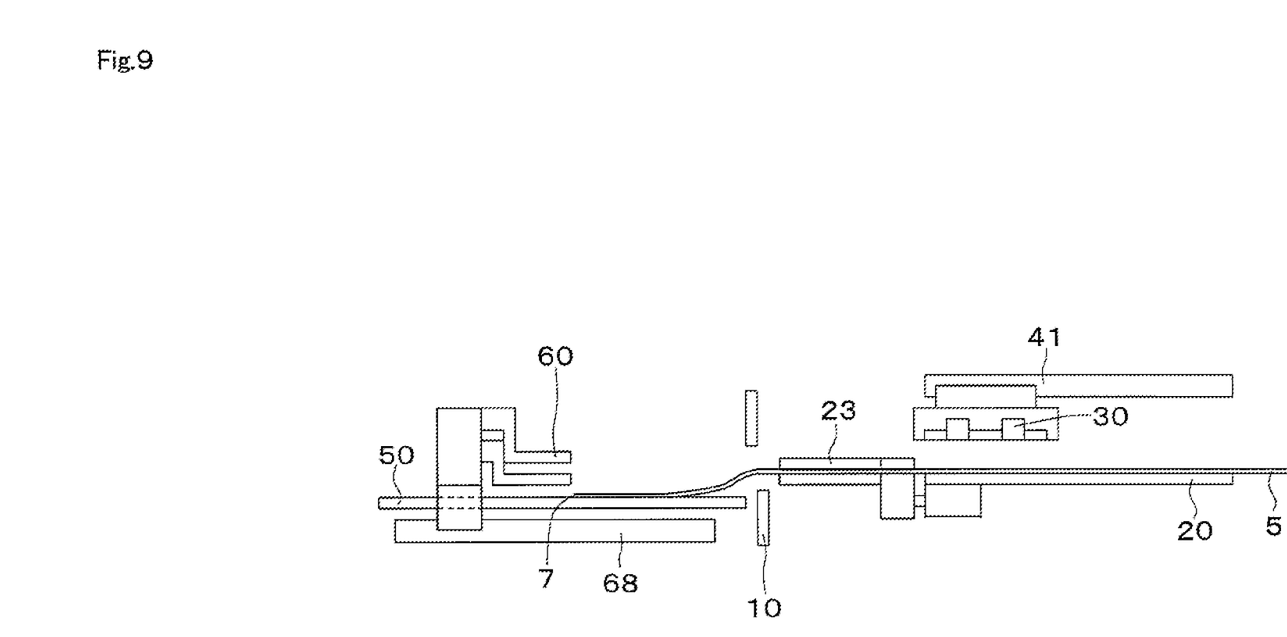
FIG. 9 is a perspective view of the cutting device 2 when the front end grasping hand 60 and the fixed-length feeding hand 30 have released the strip member 5 and the front end feeding device 23 has held the strip member 5.

Next, as illustrated in FIG. 9, the front end grasping hand 60 and the fixed-length feeding hand 30 release the strip member 5. Then, the front end 7 of the strip member 5 drops onto the carrying out table 50. After releasing the strip member 5, the front end grasping hand 60 and the fixed-length feeding hand 30 return to the waiting positions thereof. The front end grasping hand 60 and the fixed-length feeding hand 30 return to the waiting positions thereof until the front end feeding device 23 next feeds the strip member 5 a short distance. In addition, after the strip member 5 is fed a long distance and stops, the front end feeding device 23 holds the strip member 5 again at the waiting position thereof. The timing at which the front end feeding device 23 holds the strip member 5 again is, for example, before the fixed-length feeding hand 30 releases the strip member 5.

Figure 10:
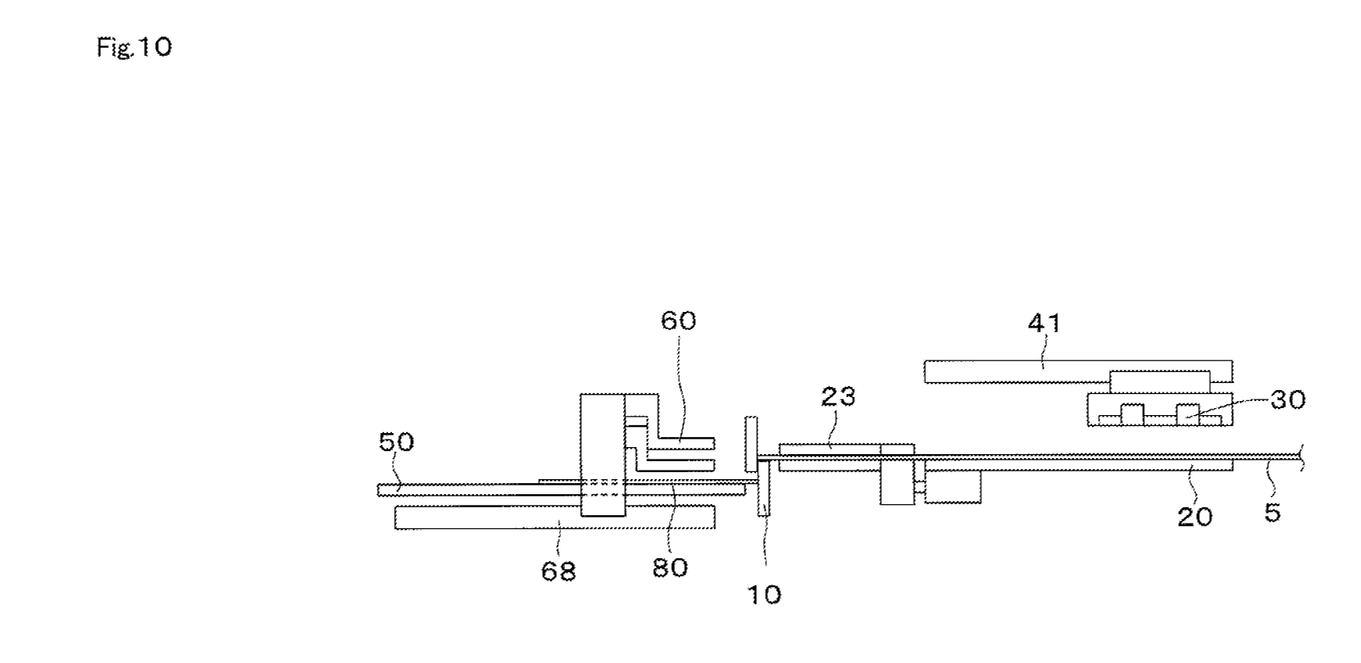
FIG. 10 is a perspective view of the cutting device 2 when a cutter 10 has cut the strip member 5.

Next, as illustrated in FIG. 10, the cutter 10 cuts the strip member 5. During the cutting, the front end feeding device 23 holds the strip member 5 in the waiting position thereof. The part of the strip member 5 close to the front end 7 is cut to form the strip piece 80. The front end grasping hand 60 and the fixed-length feeding hand 30 may return to the waiting positions thereof during the cutting.

Since the strip piece 80 having been cut is not held, the strip piece 80 drops onto the carrying out table 50 having moved to the reception position. After receiving the strip piece 80 dropped, the carrying out table 50 moves to the carry out position on the downstream side of the reception position and stops. After the carrying out table 50 stops, the carrying device 4 carries the strip piece 80 from the carrying out table 50 to the arrangement conveyer 3.

After that, the above operation is repeated. Specifically, the front end feeding device 23 that holds the strip member 5 in the waiting position of the front end feeding device 23 during the cutting of the strip member 5 feeds the strip member 5 a short distance to the downstream side while holding the strip member 5 even after the cutting. After that, the above operation is repeated.

By repeating the above operation, the strip member 5 is cut one after another, the strip pieces 80 are manufactured, carried to the arrangement conveyer 3 one after another, bonded on the arrangement conveyer 3 to complete a belt for a tire.

In the cutting method for the strip member 5 according to the embodiment, the strip member 5 is fed a long distance to the downstream side of the cutter 10 with the front end 7 of the strip member 5 held by the front end grasping hand 60 and the part of the strip member 5 close to the upstream side of the cutter 10 held by the fixed-length feeding hand 30. Accordingly, the strip member 5 does not catch easily while being fed.

Furthermore, the front end feeding device 23 holds the strip member 5 while the strip member 5 is cut and the front end feeding device 23 feeds the strip member 5 a short distance to the downstream side after the strip member 5 is cut. While the front end feeding device 23 holds the strip member 5 as described above, the front end grasping hand 60 and the fixed-length feeding hand 30 having fed the strip member 5 a long distance can return to the waiting positions thereof. In addition, the front end grasping hand 60 and the fixed-length feeding hand 30 can immediately hold the strip member 5 fed the short distance by the front end feeding device 23. As described above, the strip members 5 can be cut one after another without time-wasting.

In addition, the cutting device 2 for the strip member 5 according to the embodiment has the front end grasping hand 60 that draws the front end 7 of the strip member 5 the long distance to the downstream side while holding the front end 7 in addition to the fixed-length feeding hand 30 that feeds the strip member 5 the long distance to the downstream side. Accordingly, the strip member 5 does not catch easily while being fed.

Furthermore, the cutting device 2 has the front end feeding device 23 that holds the strip member 5 while the strip member 5 is cut and feeds the strip member 5 the short distance to the downstream side in addition to the front end grasping hand 60 and the fixed-length feeding hand 30 that feed the strip member 5 the long distance to the downstream side. Accordingly, while the front end feeding device 23 holds the strip member 5, the front end grasping hand 60 and the fixed-length feeding hand 30 having fed the strip member 5 the long distance can return to the waiting positions thereof. As a result, the front end grasping hand 60 and the fixed-length feeding hand 30 can immediately hold the strip member 5 fed the short distance by the front end feeding device 23. Accordingly, the strip members 5 can be cut one after another without time-wasting.

The embodiment described above is only an example and does not limit the scope of the invention. Various changes, replacements, and omissions can be made to the embodiment described above without changing the spirit of the invention. For example, the structures of the front end feeding device 23, the fixed-length feeding device 40, the front end grasping hand 60 and means that operate and move these components are not limited to the structures in the embodiment described above as long as the structure can feed the strip member 5 described above.

DESCRIPTION OF REFERENCE NUMERALS AND SIGNS

1: belt manufacturing device
2: cutting device
3: arrangement conveyer
4: carrying device
5: strip member
6: cord
7: front end
10: cutter
11: blade
20: feeding table
21: side wall
23: front end feeding device
26: upper plate
27: lower plate
28: open/close device
29: moving device
30: fixed-length feeding hand
40: fixed-length feeding device
41: moving means
42: moving body
43: raising and lowering means
50: carrying out table
51: side wall
60: front end grasping hand
62: upper plate
63: lower plate
65: open/close device
67: moving device
68: moving means
69: moving body
70: horizontally moving device
80: strip piece
81: cut edge
82: uncut edge

The invention claimed is:

1. A cutting method configured to cut a strip member for a belt of a tire one after another while feeding the strip member from an upstream side to a downstream side of a cutter, the cutting method comprising:
   causing a front end feeding device provided between the cutter and a fixed-length feeding hand that feeds the strip member on the upstream side of the cutter to hold the strip member, feed a front end of the strip member a short distance to the downstream side of the cutter, release the strip member, and return to a waiting position in which the front end feeding device has been located before holding the strip member;
   causing a front end grasping hand provided on the downstream side of the cutter to hold the front end of the strip member fed the short distance and the fixed-length feeding hand to hold a part, of the strip member fed the short distance, the part being present on the upstream side of the cutter;
   causing the front end grasping hand and the fixed-length feeding hand to synchronously feed the strip member a long distance to the downstream side, release the strip member, and return to waiting positions in which the front end grasping hand and the fixed-length feeding hand have been located before holding the strip member; and
   causing the front end feeding device to hold the strip member fed the long distance in the waiting position of the front end feeding device, the cutter to perform cutting of the strip member, and the front end feeding device to feed the strip member the short distance after the cutting.

2. The cutting method for the strip member according to claim 1,
   wherein the front end feeding device feeds the strip member the short distance by moving from the waiting position to a passing position while holding the strip member,
   the front end grasping hand reaches the passing position just when or after the front end feeding device reaches the passing position and the strip member is passed from the front end feeding device to the front end grasping hand, and
   the front end grasping hand feeds the strip member die long distance by moving from the passing position to the downstream side while holding the strip member.

3. The cutting method for the strip member according to claim 1,
   wherein, before the fixed-length feeding hand releases the strip member after the strip member is fed the long distance, the front end feeding device holds the strip member in the waiting position of the front end feeding device.

4. The cutting method for the strip member according to claim 1,
wherein the front end grasping hand and the fixed-length feeding hand return to the waiting positions of the front end grasping hand and the fixed-length feeding hand while die strip member is cut after feeding the strip member the long distance and releasing the strip member.

5. The cutting method for the strip member according to claim 1,
wherein the front end feeding device holds the strip member while the strip member is cut and feeds the strip member the short distance while holding the strip member even after the strip member is cut.

6. The cutting method for the strip member according to claim 1,
wherein the step of causing the front end feeding device to feed the strip member the short distance, the step of causing the front end grasping hand and the fixed-length feeding hand to feed the strip member the long distance, and the step of causing the front end feeding device to hold the strip member and the cutter to cut the strip member are repeated.

7. A cutting device configured to cut a strip member for a belt of a tire one after another while feeding the strip member from an upstream side to a downstream side of a cutter, the cutting device comprising:

a cutter that performs cutting of the strip member each time the strip member is fed a long distance from the upstream side to the downstream side;

a front end feeding device that holds, in a waiting position on the upstream side of the cutter, the strip member fed the long distance, feeds a front end of the strip member a short distance to the downstream side of the cutter after the cutting, and releases the strip member after feeding the front end the short distance, and returns to the waiting position;

a front end grasping hand that holds the front end of the strip member fed the short distance, draws the front end the long distance to the downstream side, releases the strip member, and returns to the waiting position in which the front end grasping hand has been located before holding the strip member, the grasping hand being provided on the downstream side of the cutter; and a fixed-length feeding hand that holds a part of die strip member fed the short distance, the part being present on the upstream side of the cutter, feeds the strip member the long distance to the downstream side synchronously with the front end grasping hand, releases the strip member, and returns to a waiting position in which the fixed-length feeding hand has been located before holding the strip member, the fixed-length feeding hand being provided on the upstream side of the front end feeding device.

* * * * *